Nov. 15, 1932.   R. G. STANDERWICK   1,887,567
BRUSH RIGGING MECHANISM FOR SCHERBIUS SETS AND LIKE
CASCADES FOR CONNECTING TWO POWER SYSTEMS
Filed July 1, 1931

Inventor:
Reginald G. Standerwick,
by Charles E. Tullar
His Attorney.

Patented Nov. 15, 1932

1,887,567

UNITED STATES PATENT OFFICE

REGINALD G. STANDERWICK, OF MARBLEHEAD, MASSACHUSETTS, ASSIGNOR TO GENERAL ELECTRIC COMPANY, A CORPORATION OF NEW YORK

BRUSH RIGGING MECHANISM FOR SCHERBIUS SETS AND LIKE CASCADES FOR CONNECTING TWO POWER SYSTEMS

Application filed July 1, 1931. Serial No. 548,190.

The present invention relates to Scherbius sets and like arrangements for connecting two electrical power systems of different frequencies. There are many cases in which it is desirable to transform electric energy from one system frequency into another and to change the amount of energy to be transformed and transferred between such two systems in response to conditions existing therein.

It is well known to those skilled in the art that the amount of energy to be transformed can be changed with such Scherbius sets and like frequency changing cascades by the provision of a double brush set on the exciter machine of such cascades and properly controlling the position of the two brush sets by means of a brush rigging or shifting mechanism. An arrangement of this kind is disclosed by the patent to Hull et al. No. 1,778,599, patented October 14, 1930.

The object of my invention is an improved arrangement of an electromechanical brush rigging mechanism, in connection with a Scherbius set or like frequency transforming arrangement between two power systems.

Figure 1:
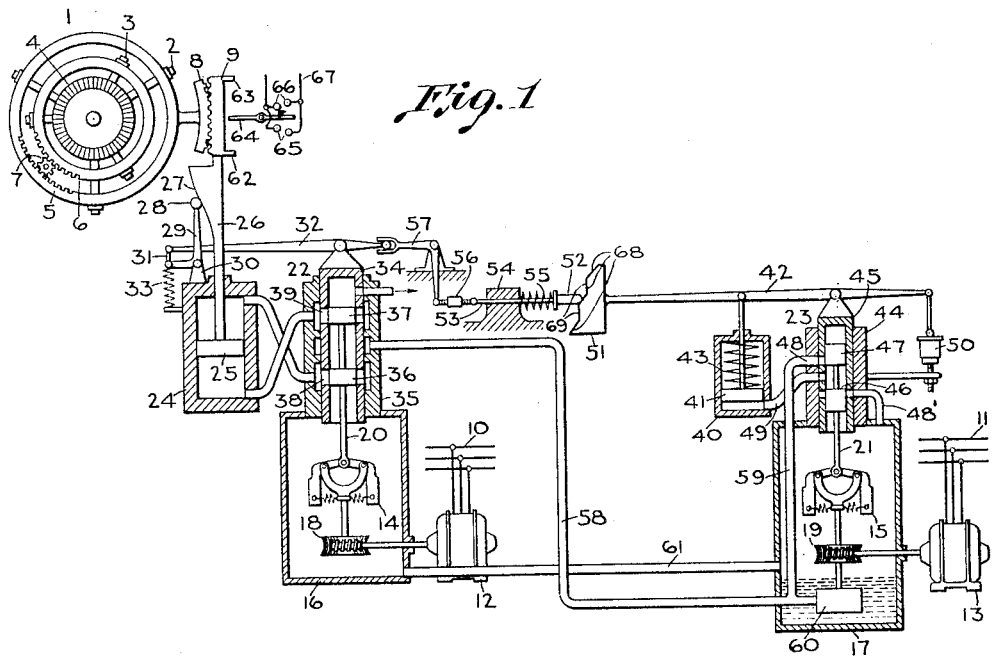
Figure 2:
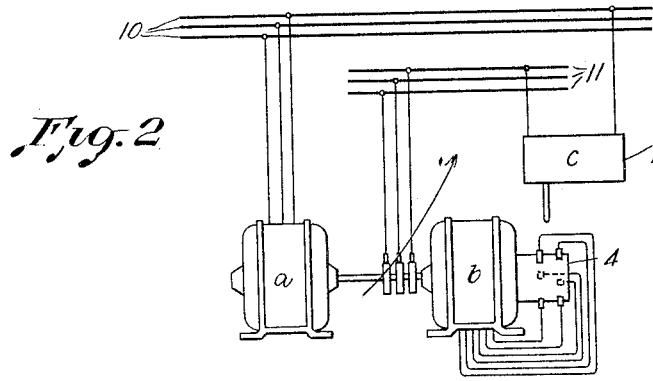

For a consideration of what I believe to be novel and my invention, attention is directed to the following description and claims in connection with the drawing appended hereto, in which Fig. 1 shows, partly diagrammatic and partly in cross section, an arrangement embodying my invention, and Fig. 2 shows diagrammatically a simple frequency changing cascade.

Referring to Fig. 2, I have shown by way of example a simple arrangement for transferring electric energy between two systems in which $a$ represents a dynamo-electric machine connected to a line 10, $b$ is another dynamo-electric machine mechanically coupled with machine $a$ and connected to another electric line 11. The currents in the two lines 10 and 11 may have the same frequency or different frequencies. It is desired to transfer energy from one system to the other in response to frequency changes. Each of the machines may be operated as a motor or as a generator depending upon the direction of the load transfer. Machine $a$ may be a synchronous machine and machine $b$ has been indicated by way of example as a commutator type dynamo machine of the type known as a Schrage motor, having a primary circuit connected through slip rings to line 11. The primary winding is also provided with a commutator 4 having two sets of brushes connected to the open stator or secondary winding. The amount and the direction of load transferred between the systems depends on the relative position of the two sets of brushes. The shifting of the brushes is accomplished automatically by a brush shifting mechanism $c$ in response to frequency conditions in the two electric lines. For a more complete understanding of the electrical details of this kind of apparatus, attention is directed to the disclosure in the above named Hull patent. In Fig. 1, where I have shown the details of my improved brush shifting apparatus, 1 represents a brush rigging or shifting mechanism of a frequency changer installation which comprises two sets of brushes 2 and 3 bearing against a commutator 4 and adapted to be moved in either direction by suitable means, in the present instance shown by the provision of toothed rims 5 and 6 to which the brushes 2 and 3 respectively are secured and a gear 7 meshing with the toothed parts of rims 5 and 6. Secured to rim 5 is a segmental gear 8 meshing with a rack 9. It will be seen that, for instance, a downward movement of rack 9 causes a movement of rim 6 in counter-clockwise direction and a corresponding movement of rim 5 in clockwise direction. 10 and 11 represent two power lines of different frequency, for instance, 60 cycles and 25 cycles, between which power has to be transferred in response to conditions existing in the two systems. It is desirable, for instance, to transfer power from system 10 to system 11 if the frequency in system 11 drops beyond a predetermined value, let us say, 24.75 cycles, and it is also desirable to then change the amount of energy transferred, for instance, from system 10 to 11 in response to the amount of a further drop in frequency, that is, to increase the energy transferred from system 10 to system 11 by an amount preferably functionally proportional to the further drop in system frequency.

12 and 13 are two small, synchronous motors connected to the two systems 10 and 11 respectively and being adapted to drive speed governors 14 and 15 respectively. In the present instance I have shown these speed governors being provided within casings 16 and 17 respectively and driven by said motors by means of suitable gears and worms as indicated at 18 and 19 respectively. Each of the speed governors is connected to a stem 20, 21 of a pilot valve forming part of fluid actuated motors 22 and 23 respectively. The fluid actuated motor 22 comprises a cylinder 24 having a piston 25 connected to a stem 26, the upper part of which is provided with a rack 9, described above. Secured to an intermediate part of stem 26 is a cam 27, in the present instance shown as being integrally formed with the stem. Slidably arranged with respect to the surface of said cam is a roll 28 provided at the end of one arm of a bell crank lever 29 which has a fulcrum 30 secured to the motor cylinder 24 and the other arm of which has its end pivotally connected by means of a short rod 31 to the left end of a floating lever 32. Bell crank lever 29 is normally pressed against the cam surface 27 by means of a suitably provided compression spring 33, in the present instance shown as being connected to one end of the bell crank lever and to a projection of motor cylinder 24. Connected to an intermediate point of floating lever 32 is a sleeve 34 which is slidably arranged in casing 35 of the pilot valve. 36 and 37 are the heads of the pilot valve secured to stem 20 which normally cover ports 38 and 39 respectively. Said ports connect the lower and upper part of sleeve 34 to the upper and lower part of the motor cylinder 24 respectively.

Fluid actuated motor 23 comprises a motor cylinder 40 having a piston 41 slidably arranged therein and being connected to an intermediate point of a floating lever 42 and being normally pressed downward by the provision of a spring 43. 44 represents the outer casing of a pilot valve having a sleeve 45 slidably arranged therein and connected to another intermediate point of floating lever 42. 46 and 47 are the heads of the pilot valve secured to stem 21, which normally cover ports 48 and 48' respectively. 49 is a conduit connecting the sleeve 45 to the lower part of motor cylinder 40. 50 represents an adjustable fulcrum for the right end of lever 42.

The left end of floating lever 42 is provided with a cam 51, the surface of which engages a pin 52 secured to a stem 53 which is slidably arranged in a support 54. The pin is pressed against the cam surface by means of a compression spring 55. At the left end of rod 53 I may provide an adjusting device 56, in the present instance shown as being formed of a nut with two right and left hand threaded bolts inserted from opposite sides, one of which being connected to the left end of rod 53 and the other being connected to one arm of bell crank lever 57, the other arm of which is bifurcated and engages the right end of floating lever 32. 58 and 59 represent two conduits connected to a pump 60 provided in casing 17 for supplying oil or like liquid to the pilot valves of the fluid actuated motors. 61 is a conduit for returning the oil or like liquid from casing 16 to casing 17. As the frequency changing apparatus is constructed for a certain maximum amount of energy to be transferred from one system to the other I may provide suitable means for indicating when such maximum value is exceeded. This has been shown in the present instance by two projections 62 and 63 provided at the lower and upper part of rack 9 respectively and being adapted to engage a contact making plate 64 which is adapted to close contacts 65 or 66 of an alarm signal circuit 67.

The operation of my mechanism is as follows: Suppose the system as shown is in balanced condition. If now, for instance, the frequency of power line 11 decreases, the speed of synchronous motor 13 will decrease proportionately and cause a corresponding decrease of the speed of governor 15 to the effect that the fly-weights of the governor move inwardly and cause an upward movement of the pilot valve stem 21. The pilot valve head 47 thereby uncovers its port 48 and permits fluid to be forced through this port and conduit 49 into the lower part of motor cylinder 40. This causes an upward movement of a piston 41 and a corresponding movement of the left end of floating lever 42 to the effect that rod 53 moves to the left and causes a movement of bell crank lever 57 in a clockwise direction. This effects an upward movement of sleeve 34 of fluid actuated motor 22 to the effect that oil or like liquid is supplied to the upper part of cylinder 24 and drained off from the lower part thereof, resulting in a downward movement of piston 25 and corresponding turning of the brush rigging mechanism. The downward movement of stem 26 also causes a turning actuation of bell crank lever 29 in a counterclockwise direction, owing to the provision of cam 27, to the effect that the left end of floating lever 32 is moved downwardly. This movement is imparted to sleeve 34 of the pilot valve which thus resumes its original position. Also, with respect to the fluid actuated motor 23 the upward movement of piston 41 causes a corresponding movement of sleeve 45 of the pilot valve which thus again covers the pilot valve ports.

If the frequency of system 11 increases it will cause a corresponding actuation of fluid actuated motor 23 but in opposite direction, to the effect that the left end of floating lever 42 is moved downwardly and the bell crank lever 57 turned in a counter-clockwise direction. This causes an actuation of fluid actuated motor 22 to the effect that stem 26 of the motor cylinder moves upwardly and causes an actuation of the brush rigging mechanism in the opposite sense and also a turning movement of bell crank lever 29 in a counter-clockwise direction. The actuation of bell crank lever 29 effects a restoring of the position of pilot valve sleeve 34.

If the frequency of system 10 decreases it will cause corresponding decrease of the speed of synchronous motor 12 and accordingly an inward movement of the arms of the speed governor 14 to the effect that stem 20 of the pilot valve is moved upwardly and the heads 36 and 37 of the pilot valve uncover the corresponding ports 38 and 39 to permit fluid to be forced into the lower part and drained off from the upper part of cylinder 24. This causes an upward movement of stem 26 and a corresponding turning movement of the brush rigging mechanism. The upward movement of stem 26 also effects a turning movement of bell crank lever 29 in a clockwise direction which thus effects an upward movement of sleeve 34 to again cover heads 36 and 37 of the pilot valve.

If the frequency of line 10 increases it will cause a corresponding actuation of fluid actuated motor 22 but in the opposite direction, to the effect that stem 26 of the motor 24 is moved downwardly and causes a turning movement of the brush rigging mechanism in the opposite sense and also a turning movement of bell crank lever 29 in a counter-clockwise direction.

It will be noted with respect to the pilot valve of fluid actuated motor 22 that the sleeve 34 of this valve operates in the case in which an actuation is called for by a change in system 11 as a means for initiating actuation of fluid actuated motor 22, whereas in the case in which a change in power line 10 takes place this sleeve acts as a means for restoring the original position of the pilot valve. In the latter case the actuation of fluid actuated motor 22 is initiated by a movement of pilot valve heads 36 and 37. It will also be understood that in case the frequency of both systems changes in the same direction, for instance, both frequencies increase or decrease, no actuation of the control mechanism takes place. Furthermore, it will be understood that by suitably shaping cam 51 I may cause no energy to be exchanged between the two systems within certain limits of changes in frequency. In the present instance I have indicated this by the provision of three diagonally arranged parts 68 of the cam surface. If pin 52 slides on one of these diagonal parts actuation of the brush rigging mechanism will take place in response to a change in system 11. No actuation in response to changes in system 11 takes place while pin 52 is sliding on the vertical parts 69 of cam 51.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. In a frequency changer installation for transferring energy between two electric power systems, the combination with two power lines and a commutator type dynamo-electric machine having movable brush rigging mechanism, of a motor for moving the brush rigging mechanism, speed responsive means for controlling the motor, and frequency responsive means for actuating the speed responsive means.

2. In a frequency changer installation for transferring energy between two electric power systems, the combination with two power lines and a commutator type dynamo-electric machine having movable brush rigging mechanism, of two synchronous motors connected to these lines respectively, a speed responsive device driven by each of the motors, and hydraulic means controlled by these devices for actuating said brush rigging mechanism.

3. In a frequency changer installation for transferring energy between two electric power systems, the combination with two power lines and a commutator type dynamo-electric machine having movable brush rigging mechanism, of two synchronous motors connected to these lines respectively, a speed responsive device for each of said motors, a fluid actuated motor controlled by each of said devices, means for transferring the movements of one of said fluid actuated motors to the other, and means for controlling said brush rigging mechanism by said other fluid actuated motor.

4. In a frequency changer installation for transferring energy between two electric power systems, the combination with two power lines and a commutator type dynamo-electric machine having movable brush rigging mechanism, of two synchronous motors each being connected to one of said power lines, a speed responsive device for each of said synchronous motors, a fluid actuated motor for each of said speed governors, means for transferring the movement of one of said fluid actuated motors to said other fluid actuated motor comprising floating levers secured to the fluid actuated motors, a cam member fastened to one of said floating levers and being adapted to cause actuation of said other floating lever, and means for moving the brush rigging mechanism by said second fluid actuated motor.

5. In a frequency changer installation for transferring energy between two electric power systems, the combination with two power lines and a commutator type dynamo-electric machine having movable brush rigging mechanism, of a first and second synchronous motor each being connected to one of said power lines, speed responsive devices actuated by said first and second synchronous motor respectively, a first and a second fluid actuated motor having pilot valves actuated by said speed responsive devices respectively and motor cylinders actuated by the pilot valves respectively, a first and a second floating lever for said fluid actuated motors respectively, means for transferring movement of the second floating lever to the first floating lever comprising a cam secured to the second floating lever, a member engaging the first floating lever and being normally yieldingly pressed against said cam, means for changing the pressure between the cam and the member in response to actuation of the first fluid actuated motor comprising another cam fastened to the cylinder piston of the first fluid actuated motor.

In witness whereof, I have hereto set my hand.

REGINALD G. STANDERWICK.